US006941468B2

(12) United States Patent
Johnson

(10) Patent No.: US 6,941,468 B2
(45) Date of Patent: Sep. 6, 2005

(54) HAND-HELD DEVICE FORGOTTEN PASSWORD NOTIFICATION

(75) Inventor: Carolynn Rae Johnson, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 64 days.

(21) Appl. No.: 10/139,448

(22) Filed: May 6, 2002

(65) Prior Publication Data

US 2003/0208683 A1 Nov. 6, 2003

(51) Int. Cl.[7] .................................................. H04L 9/00
(52) U.S. Cl. ...................................... 713/200; 713/202
(58) Field of Search .............................. 713/200–202, 713/168, 183–184, 192–194; 340/5.54, 5.8, 5.81–5.85; 455/556.2; 705/67, 65

(56) References Cited

U.S. PATENT DOCUMENTS

| | | | |
|---|---|---|---|
| 4,775,928 A | * | 10/1988 | Kendall et al. ............. 713/310 |
| 5,226,080 A | * | 7/1993 | Cole et al. ................... 713/183 |
| 6,185,308 B1 | * | 2/2001 | Ando et al. .................. 380/286 |
| 6,360,322 B1 | * | 3/2002 | Grawrock .................... 713/202 |
| 6,404,884 B1 | * | 6/2002 | Marwell et al. ........ 379/265.13 |
| 6,530,081 B1 | * | 3/2003 | Hayes et al. ................. 717/176 |
| 6,654,767 B2 | * | 11/2003 | McAnaney et al. ...... 707/104.1 |
| 2003/0061520 A1 | * | 3/2003 | Zellers et al. ............... 713/202 |

OTHER PUBLICATIONS

Extended Systems– Server Synchronization: The Robust Solution for Enterprise PIM Data www.extendedsystems.com/go/pimsync.*

* cited by examiner

*Primary Examiner*—Hosuk Song
(74) *Attorney, Agent, or Firm*—Joseph S. Tripoli; Ronald H. Kurdyla; Jeffrey M. Navon

(57) ABSTRACT

There is provided a password manager for a hand-held device. The hand-held device is included in a system managed by an administrator and having a server and a network. The network is for synchronizing the hand-held device and the server. An input device receives a user input that indicates that a user of the hand-held device has forgotten an established password for the hand-held device. A notification module automatically transmits a notification of forgotten password to the administrator in response to the user input.

15 Claims, 4 Drawing Sheets

HAND-HELD DEVICE FORGOTTEN PASSWORD NOTIFICATION

BACKGROUND OF THE INVENTION

1. Field of the Invention

The present invention generally relates to hand-held devices and, more particularly, to providing a notification that a user of a hand-held device has forgotten his or her password.

2. Background of the Invention

Most handheld devices allow the user to password protect the device so that only he or she can access the information stored to that device. Once a password is established for a particular device, the user must enter that password, typically at power-on, prior to accessing the information stored to the device.

FIG. 1 is a diagram illustrating a screen 100 that allows a user of a hand-held device to establish a password, according to the prior art. The screen 100 includes a first box 110 for entering a password, a second box 120 for confirming the password, a plurality of possible selections 130 for when the password should be required, and an apply input 140. FIG. 2 is a diagram illustrating a screen 200 that requires a user of a hand-held device to provide a password to unlock the hand-held device, according to the prior art. The screen 200 includes a first box 210 for entering the password, and an accept input 220.

If the user of a hand-held device sets a password to protect the contents stored to the device and subsequently forgets the password, then the device has become useless until such a time as the user recalls the forgotten password (which may not be possible) or is able to have the password reset at some later point (which may be inconvenient).

Some hand-held devices allow the user to delete the forgotten password along with all sensitive information stored to the device. However, this is undesirable because the user must then go through the tedious process of reentering or re-downloading the deleted content. Other handheld devices require that the user return the device to the manufacturer to delete the forgotten password. This is also undesirable because the user would be required to be without the device for some period of time. Thus, neither of these solutions is acceptable.

Accordingly, it would be desirable and highly advantageous to have a hand-held device that provides a notification to a system administrator that the user of the hand-held device has forgotten his or her password. Such an approach should allow the system administrator to reset the forgotten password or allow the user to use an emergency password until a new password can be assigned.

SUMMARY OF THE INVENTION

The problems stated above, as well as other related problems of the prior art, are solved by the present invention, which is directed to a method and apparatus for providing a notification that a user of a hand-held device has forgotten his or her password. Such a hand-held device is part of a system that includes a server and a network to connect the hand-held device to the server. Such a system may include one or more hand-held devices, one or more servers, and one or more networks.

According to an aspect of the present invention, there is provided a password manager for a hand-held device. The hand-held device is comprised in a system managed by an administrator and having a server and a network. The network is for synchronizing the hand-held device and the server. An input device receives a user input that indicates that a user of the hand-held device has forgotten an established password for the hand-held device. A notification module (420) automatically transmits a notification of forgotten password to the administrator in response to the user input.

According to another aspect of the present invention, in a password protected system that is managed by an administrator and that includes a hand-held device, a server, and a network, there is provided a method for managing passwords. The network connects the hand-held device to the server. A user input is received that indicates that a user of the hand-held device has forgotten an established password for the hand-held device. A notification of forgotten password is automatically transmitted to the administrator in response to the user input.

These and other aspects, features and advantages of the present invention will become apparent from the following detailed description of preferred embodiments, which is to be read in connection with the accompanying drawings.

DETAILED DESCRIPTION OF THE INVENTION

Figure 1:
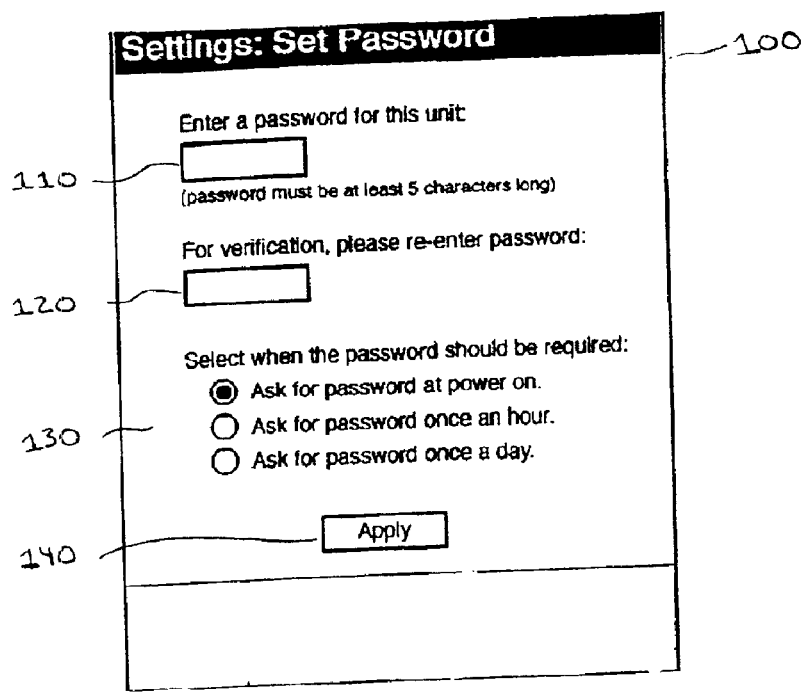
FIG. 1 is a diagram illustrating a screen that allows a user of a hand-held device to establish a password, according to the prior art.
Figure 2:
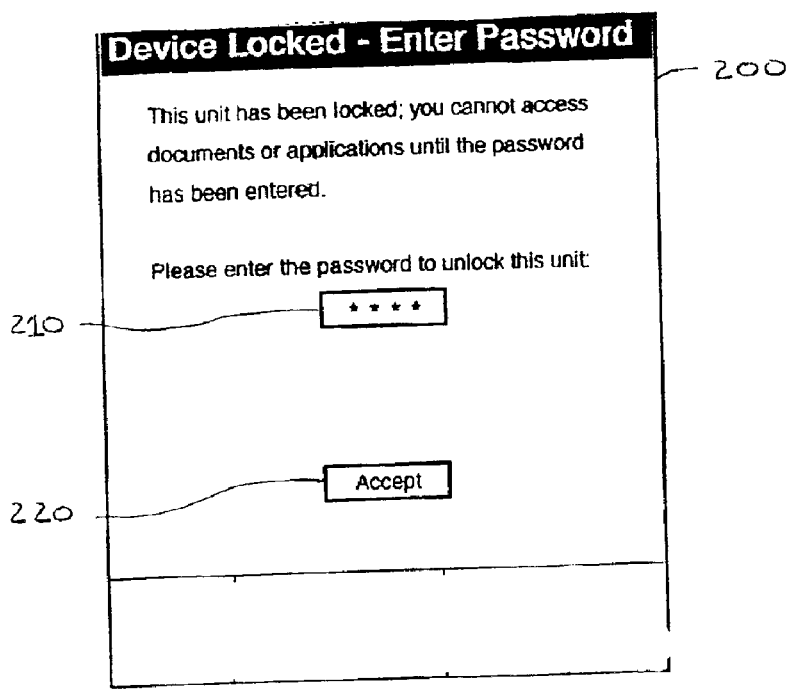
FIG. 2 is a diagram illustrating a screen that requires a user of a hand-held device to provide a password to unlock the hand-held device, according to the prior art.

The present invention is directed to a method and apparatus for providing a notification that a user of a hand-held device has forgotten his or her password. Such a hand-held device is part of a system that includes a server and a network. The network connects the hand-held device to the server. Such a system may include one or more hand-held devices, one or more servers, and one or more networks.

The present invention allows a user of a hand-held device to instruct the hand-held device to send a "forgotten password notification" to a system administrator, should the user set a password for his or her hand-held device, lock the hand-held device, and subsequently forget the password. The "forgotten password notification" may be automatically sent the next time the hand-held device is synched to the network. It is to be appreciated that as used herein, the term "administrator" refers to a person(s), software, hardware, or any combination thereof.

According to one illustrative embodiment of the present invention, the hand-held device password is automatically reset to something known to the employee assigned to that hand-held device (e.g., employee number, social security number, and so forth). According to another illustrative embodiment of the present invention, the administrator could manually reset the password and communicate the new password to the employee via some other means (e.g., email, telephone, alphanumeric pager, and so forth).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 3:
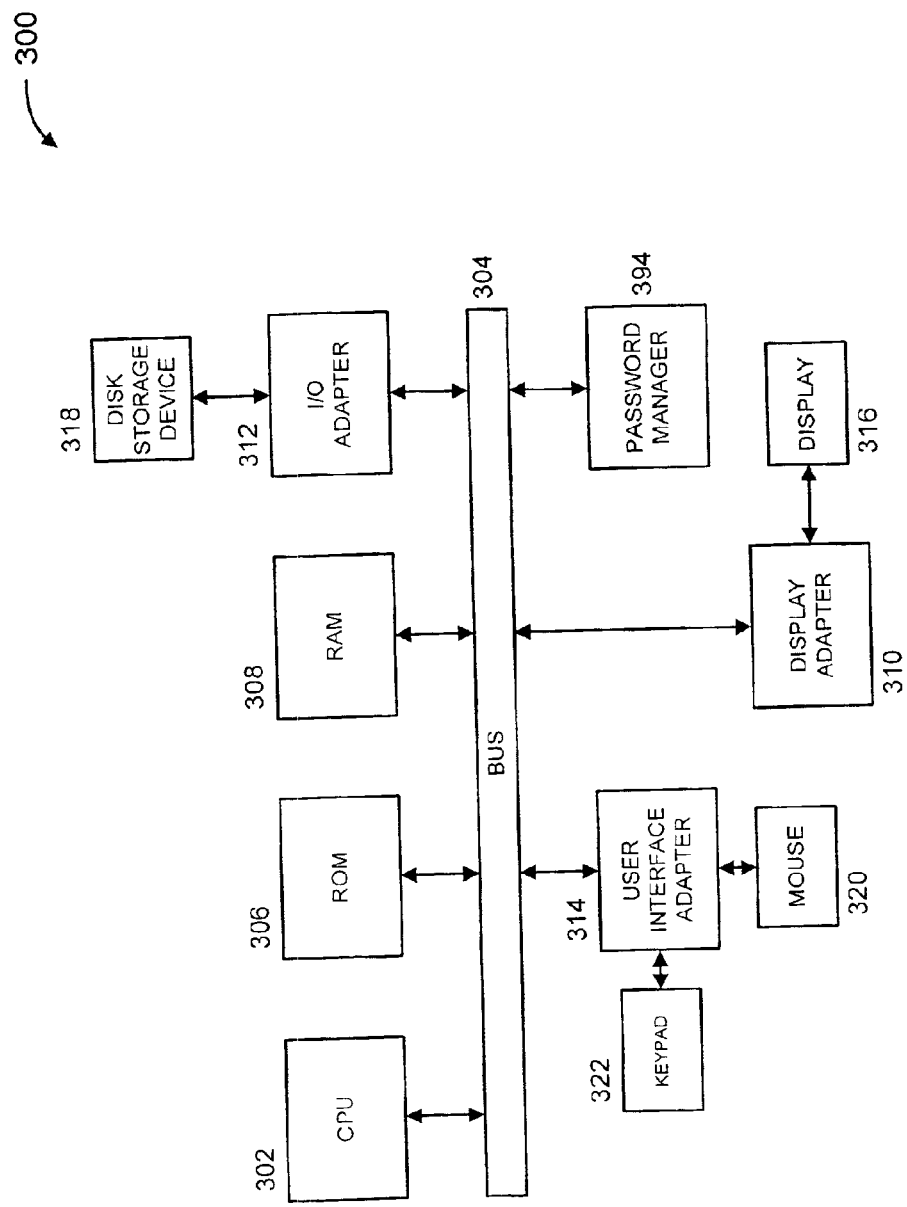
FIG. 3 is a block diagram illustrating a hand-held device 300 to which the present invention may be applied, according to an illustrative embodiment of the present invention.

FIG. 3 is a block diagram illustrating a hand-held device 300 to which the present invention may be applied, according to an illustrative embodiment of the present invention. The hand-held device 300 includes at least one processor (CPU) 302 operatively coupled to other components via a system bus 304. A read only memory (ROM) 306, a random access memory (RAM) 308, a display adapter 310, an I/O adapter 312, and a user interface adapter 314 are operatively coupled to the system bus 304.

A display device 316 is operatively coupled to system bus 304 by display adapter 310. A disk storage device (e.g., a magnetic or optical disk storage device) 318 is operatively coupled to system bus 304 by I/O adapter 312.

A mouse 320 and keypad 322 are operatively coupled to system bus 304 by user interface adapter 314. The mouse 320 and keypad 322 are used to input and output information to and from system 300. It is to be appreciated that keypad 322 may be, for example, a standard keyboard (e.g., qwerty type) or may be a specialized keyboard or keypad having an abbreviated key set.

The hand-held device 300 further includes a password manager 394.

Figure 4:
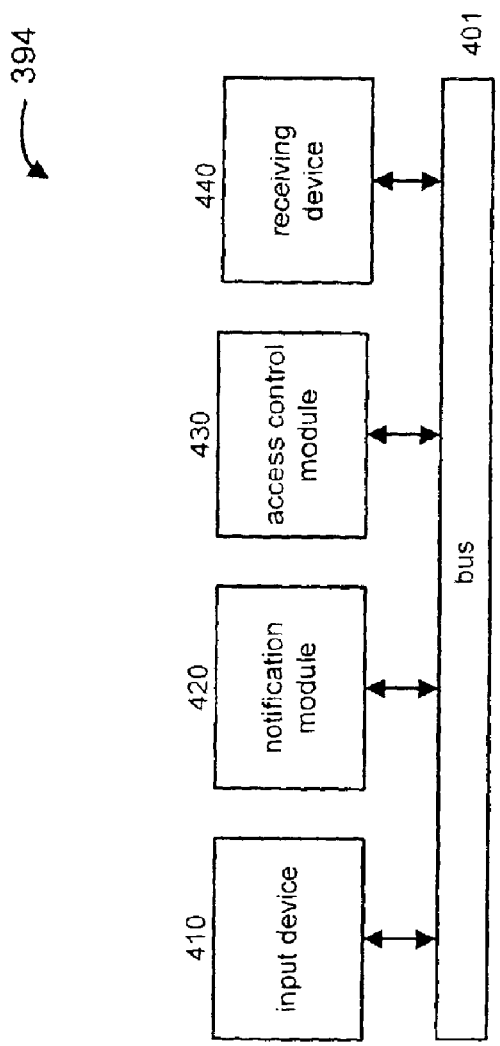
FIG. 4 is a block diagram illustrating a password manager 394 for a hand-held device, according to an illustrative embodiment of the present invention.

FIG. 4 is a block diagram illustrating a password manager 394 for a hand-held device, according to an illustrative embodiment of the present invention. The hand-held device is part of a system that includes a server and a network. The network connects the hand-held device to the server. While the system is described herein in terms of a single hand-held device, a single server, and a single network, it is to be appreciated that such a system may include one or more hand-held devices, one or more servers, and one or more networks, while maintaining the spirit and scope of the present invention. The password manager 394 includes the following elements interconnected by bus 401: an input device 410; a notification module 420; an access control module 430; and a receiving device 440.

Preferably, the hand-held device is an eTablet and, thus, the following description of the present invention will make reference to such. However, as noted above, the present invention may be employed with any type of hand-held device (e.g., eTablet, personal digital assistant (PDA), cellular phone, and so forth), while maintaining the spirit and scope of the present invention.

The input device 410 receives a user input that indicates that a user of the eTablet has forgotten an established password for the eTablet. The input device may include, but is not limited to, a keyboard, a mouse, a switch, a button, a touch sensitive device, and so forth. The notification module 420 automatically transmits a notification of forgotten password to the administrator in response to the user input. Moreover, in some illustrative embodiments of the present invention, the notification module 420 delays an automatic transmission of the notification until an attempt is made to synchronize the eTablet with the server. The access control module 430 locks and unlocks the eTablet based on whether the established password (previously assigned password or newly assigned password) provided by the user is correct. Moreover, in some illustrative embodiments of the present invention, the access control module 430 automatically defaults to an emergency password that permits access to the eTablet (i.e., unlocks the eTablet) in response to the user input. The emergency password may be used while the user is awaiting receipt of a new password from the system administrator. The receiving device 440 receives the new password from the administrator in response to the user input. It is to be appreciated that the receiving device 440 is optional and the user may receive the new password from any means including, but not limited to, a telephone, e-mail, the Internet, and so forth.

While the password manager 394 is described to include the preceding elements, one of ordinary skill in the related art will readily appreciated that some (one or more) of the preceding elements may already be included in the hand-held device to which the password manager 394 is included. In such an event, an element already present in a hand-held device need not be duplicated in the password manager 394. That is, given the teachings of the present invention provided herein, one of ordinary skill in the related art will contemplate these and various other configuration of the elements of the password manager 394, while maintaining the spirit and scope of the present invention.

Figure 5:
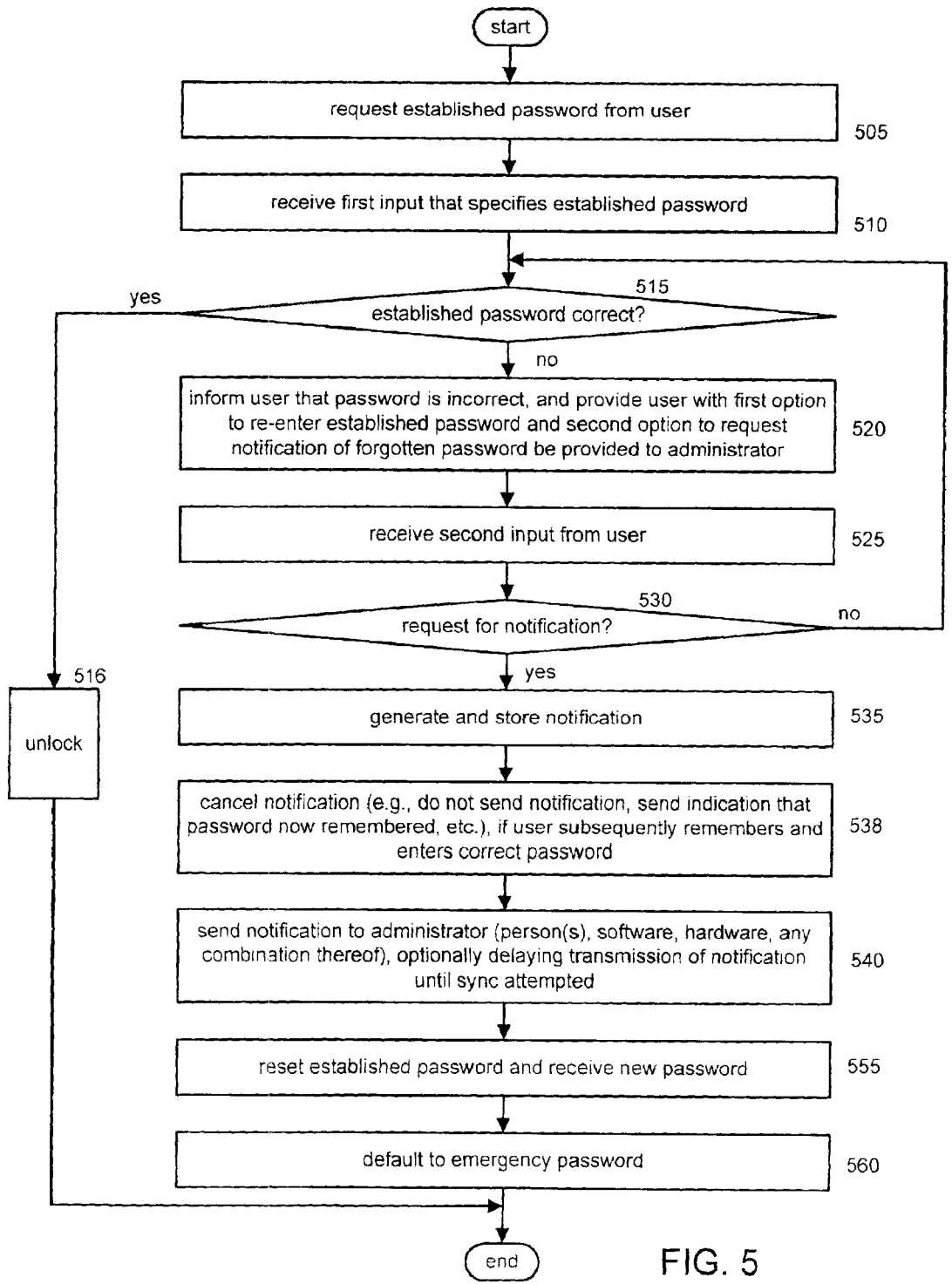
FIG. 5 is a flow diagram illustrating a method for using an eTablet having forgotten password notification capabilities, according to an illustrative embodiment of the present invention.

FIG. 5 is a flow diagram illustrating a method for using an eTablet having forgotten password notification capabilities, according to an illustrative embodiment of the present invention. That is, the method of FIG. 5 is directed to the steps taken when a user has established a password for the eTablet but subsequently has forgotten that password, rendering the content stored to the eTablet inaccessible and, thus, rendering the eTablet useless. According to the illustrative embodiment of FIG. 5, the eTablet is configured to synchronize with a server through a network.

An established password is requested from a user of the eTablet (step 505). The request may be made at any time including, for example, at power up, pre-specified times, or randomly. A first input is received that specifies the established password (step 510).

It is then determined whether the established password specified at step 510 is correct (step 515). If so, then the eTablet is unlocked (step 516) and the method is terminated.

However, if the established password is not correct, then the user is informed that the established password is not correct and the user is provided with a first option to re-enter the established password and a second option to request that the eTablet automatically submit a notification to a system administrator that the user has forgotten the established password (step 520). The second option may be provided to the user so as to include cursory or detailed instructions as to the notification. It is to be appreciated that as used herein the term "administrator" refers to an actual person(s), software, hardware, or any combination thereof.

A second input is received from the user (step 525). It is then determined whether the second input is the established password (first option) or the request for notification (second option) (step 530). If the second input is the established password, then the method returns to step 515. However, if the second input is the request for notification, then the notification is generated and stored (step 535).

It is to be appreciated that in some embodiments of the present invention, if a user remembers and enters the correct password after having already requesting the notification, then the notification can be cancelled (e.g., by not sending the notification to the administrator, by sending a follow-up notification that the password has been remembered, and so forth) (step 538).

When synchronization is attempted between the eTablet and the server, the notification is sent to the administrator to alert them that the user has forgotten his or her password (step 540). It is to be appreciated that in some embodiments of the present invention, the notification may generated at step 535 and then immediately sent (or delayed a pre-specified or random time) irrespective of whether or not synchronization has been attempted by the user.

In response to the notification, the administrator resets the established password in the system, assigns a new password, and provides the new password to the user of the hand-held device. Accordingly, the established password is reset in the hand-held device, and a new password is received by the user (step 555). The new password may be provided to the user via telephone, e-mail, and/or through any other means. In this case, the user of the hand-held device must wait until the new password is received before the user can use the hand-held device.

However, if the user cannot wait until a new password is provided or it is simply not desirable to have the user wait for the new password for whatever reason, then an optional step (i.e., step 560 below) may be performed to allow the user to access the hand-held device by activating an emergency password that was previously assigned for emergency situations and that was previously communicated to the user of the hand-held device. At step 560, the hand-held device defaults to a previously designated emergency password. Step 560 may be performed when synchronization is next attempted (i.e., after the notification has been sent from the hand-held device) between the hand-held device and the server, or at any other time subsequent to receiving the second input corresponding to the second option. This allows the user of the hand-held device to use the hand-held device without having to wait for a new password to be assigned and provided to him or her. It is to be appreciated that step 560 may be performed for some users and not for other users, based on pre-specified criteria.

Thus, by using the present invention, only the authorized user of the hand-held device (e.g., eTablet) would be able to gain access to the new password, thereby solving the forgotten password problem without the risk of an unauthorized user submitting the forgotten password notification and gaining access to sensitive material. It is to be appreciated the order of the steps corresponding to the method of FIG. 5 may be readily rearranged by one of ordinary skill in the art, while maintaining the spirit and scope of the present invention.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A password manager for a hand-held device, the hand-held device included in a system managed by an administrator and having a server and a network, the network for synchronizing the hand-held device and the server, said password manager comprising:

an input device for receiving a user input that indicates that a user of the hand-held device has forgotten an established password for the hand-held device; and a notification module for automatically transmitting a notification of forgotten password and instructions corresponding to the notification to the administrator in response to the user input, wherein the user input does not require any user-identifying information provided by the user, and wherein the user input includes the instructions corresponding to the notification.

2. The password manager of claim 1, wherein said notification module delays an automatic transmission of the notification until an attempt is made to synchronize the hand-held device with the sewer.

3. The password manager of claim 1, further comprising an access control module for permitting or restricting an access to the hand-held device based on whether the established password provided by the user is correct, and for automatically defaulting to an emergency password that permits the access to the hand-held device in response to the user input.

4. The password manager of claim 1, further comprising a receiving device for receiving a new password from the administrator in response to the user input.

5. The password manager of claim 1, wherein the administrator is one of a person, a software program, a hardware device, and any combination thereof.

6. The password manager of claim 1, wherein the hand-held device is an electronic Tablet.

7. In a password protected system that is managed by an administrator and that includes a hand-held device, a server, and a network, the network for connecting the hand-held device to the server, a method for managing passwords, said method comprising the steps of:

receiving a user input that indicates that a user of the hand-held device has forgotten an established password for the hand-held device; and automatically transmitting a notification of forgotten password and instructions corresponding to the notification to the administrator in response to the user input, wherein the user input does not require any user-identifying information provided by the user, and wherein the user input further includes the instructions specified by the user corresponding to the notification.

8. The method of claim 7, wherein said transmitting step is delayed until an attempt is made to synchronize the hand-held device with the server.

9. The method of claim 7, further comprising the step of automatically defaulting to an emergency password that allows the user of the hand-held device to access the hand-held device, in response to the user input.

10. The method of claim 7, further comprising the step of receiving a new password from the administrator, in response to the user input.

11. The method of claim 7, wherein the administrator is one of a person, a software program, a hardware device, and any combination thereof.

12. The method of claim 7, further comprising the step of canceling the notification, if the user subsequently remembers the established password.

13. The method of claim 12, wherein said step of canceling the notification comprises the step of canceling said transmitting step.

14. The method of claim 12, wherein said step of canceling the notification comprises the step of transmitting an indication to the administrator that the user has subsequently remembered the established password.

15. The password manager of claim 7, wherein the hand-held device is an electronic Tablet.

* * * * *